(12) United States Patent
Lorenz

(10) Patent No.: US 8,388,483 B2
(45) Date of Patent: Mar. 5, 2013

(54) SPACE-SAVING TRANSMISSION ARRANGEMENT

(75) Inventor: Elmar Lorenz, Hügelsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 206 days.

(21) Appl. No.: 12/736,776

(22) PCT Filed: Apr. 14, 2009

(86) PCT No.: PCT/DE2009/000518
§ 371 (c)(1),
(2), (4) Date: Feb. 10, 2011

(87) PCT Pub. No.: WO2009/135456
PCT Pub. Date: Nov. 12, 2009

(65) Prior Publication Data
US 2011/0160016 A1 Jun. 30, 2011

Related U.S. Application Data

(60) Provisional application No. 61/127,115, filed on May 9, 2008.

(51) Int. Cl.
F16H 37/08 (2006.01)

(52) U.S. Cl. ....................................................... 475/206

(58) Field of Classification Search .................. None
See application file for complete search history.

(56) References Cited

U.S. PATENT DOCUMENTS

| 4,317,389 | A | * | 3/1982 | Falzoni ............. | 475/204 |
| 4,335,629 | A | * | 6/1982 | Falzoni ............. | 475/210 |
| 4,392,394 | A | * | 7/1983 | Hofbauer et al. .... | 475/204 |
| 4,706,518 | A | * | 11/1987 | Moroto et al. ...... | 475/210 |
| 5,292,290 | A | * | 3/1994 | Scholz et al. ...... | 475/231 |
| 7,288,043 | B2 | * | 10/2007 | Shioiri et al. ..... | 475/210 |
| 2008/0035409 | A1 | * | 2/2008 | Faust .............. | 180/337 |

FOREIGN PATENT DOCUMENTS

| DE | 29 48 195 A1 | 6/1980 |
| DE | 30 01 784 A1 | 7/1980 |
| DE | 196 31 243 A1 | 2/1997 |
| DE | 10 2007 033 700 A1 | 2/2008 |
| GB | 2 046 374 A | 11/1980 |

OTHER PUBLICATIONS

"Kompaktes Achsgetriebe für Fahrzeuge mit Frontantrieb und quer eingebauten Motor," ATZ Automobiltechnische Zeitschrift, BD. 108, Nr. 1, pp. 46-51, 2006.

* cited by examiner

Primary Examiner — Dirk Wright
(74) Attorney, Agent, or Firm — Alfred J. Mangels

(57) ABSTRACT

A differential gearbox including a disk on the input side, a first drive part that is non-rotatably connected to a first driven axle, and a second drive part that is non-rotatably connected to a second driven axle. A planetary gear arrangement is provided between the first drive part and the second drive part for transmitting torque from the disk on the input side to the first drive part and the second drive part. The first drive part is a first drive disk and includes a concavity radially outwardly of the first driven axle. The second drive part is a second drive disk extending radially outwardly of the second driven axle. The concavity is directed away from the second drive disk. The planetary gear arrangement is disposed in a space that is formed by the concavity of the first drive disk and the opposing region of the second drive disk.

23 Claims, 3 Drawing Sheets

SPACE-SAVING TRANSMISSION ARRANGEMENT

BACKGROUND OF THE INVENTION

1. Field of the Invention

The present invention relates to a transmission arrangement, particularly a differential transmission.

2. Description of the Related Art

DE 10 2007 033 700 A1 discloses a continuously variable conical pulley transmission that includes an input-side and an output-side conical pulley set. Every conical pulley set features a fixed disk and a movable disk that is arranged, respectively, on an input-side and an output-side shaft, and are connectable over a continuously variable means for torque transmission.

DE 196 31 243 C2 discloses a transmission unit for a motor vehicle, among others, in which the fixed disk of a continuously variable transmission (CVT) is in connection with a differential via a driving axle and a planetary transmission that in the drive train is followed by a drive axle, and hence the drive wheel connected with it. A problem with such transmission arrangements is that they require a relatively large assembly space and are relatively heavy.

An object of the present invention is to provide a transmission arrangement to connect a differential to a disk set of a continuously variable transmission, whereby the transmission arrangement should be comparatively compact, weight convenient, and economically producible.

The object is achieved by a transmission arrangement with the features hereinafter described.

SUMMARY OF THE INVENTION

The essential advantage of the transmission arrangement in accordance with the present invention exists in that the planet gears of an axle differential are displaced radially outwards, so that they can lie axially near the fixed disk of a continuously variable transmission. In this manner, an extremely compact, radially space-saving transmission arrangement is provided, and the thickness of the planet gears can be reduced. In this manner, the entire transmission arrangement is relatively economical and producible in an assembly-space-neutral manner, and is comparatively light in weight because the axle differential is essentially producible of simple sheet metal parts.

The differential in the transmission arrangement in accordance with the present invention can be mounted advantageously, as a pre-assembled compact component, directly on a disk set of a continuously variable transmission.

Because the driven axles of the differential of the transmission arrangement in accordance with the present invention feature the form of hollow shafts connected directly with the wheels of a motor vehicle, or directly with the individual axle differentials of an all-wheel-drive vehicle that are supported coaxially to each other, further saving of assembly space would prove advantageously attainable.

The present transmission arrangement is particularly advantageously suitable for use with a continuously variable transmission in a front-transverse arrangement or for assembly-space-critical installations.

BRIEF DESCRIPTION OF THE DRAWINGS

In the following description the invention and its embodiments are clarified in more detail in context with the drawing figures. Shown are.

DESCRIPTION OF THE PREFERRED EMBODIMENTS

Figure 1:
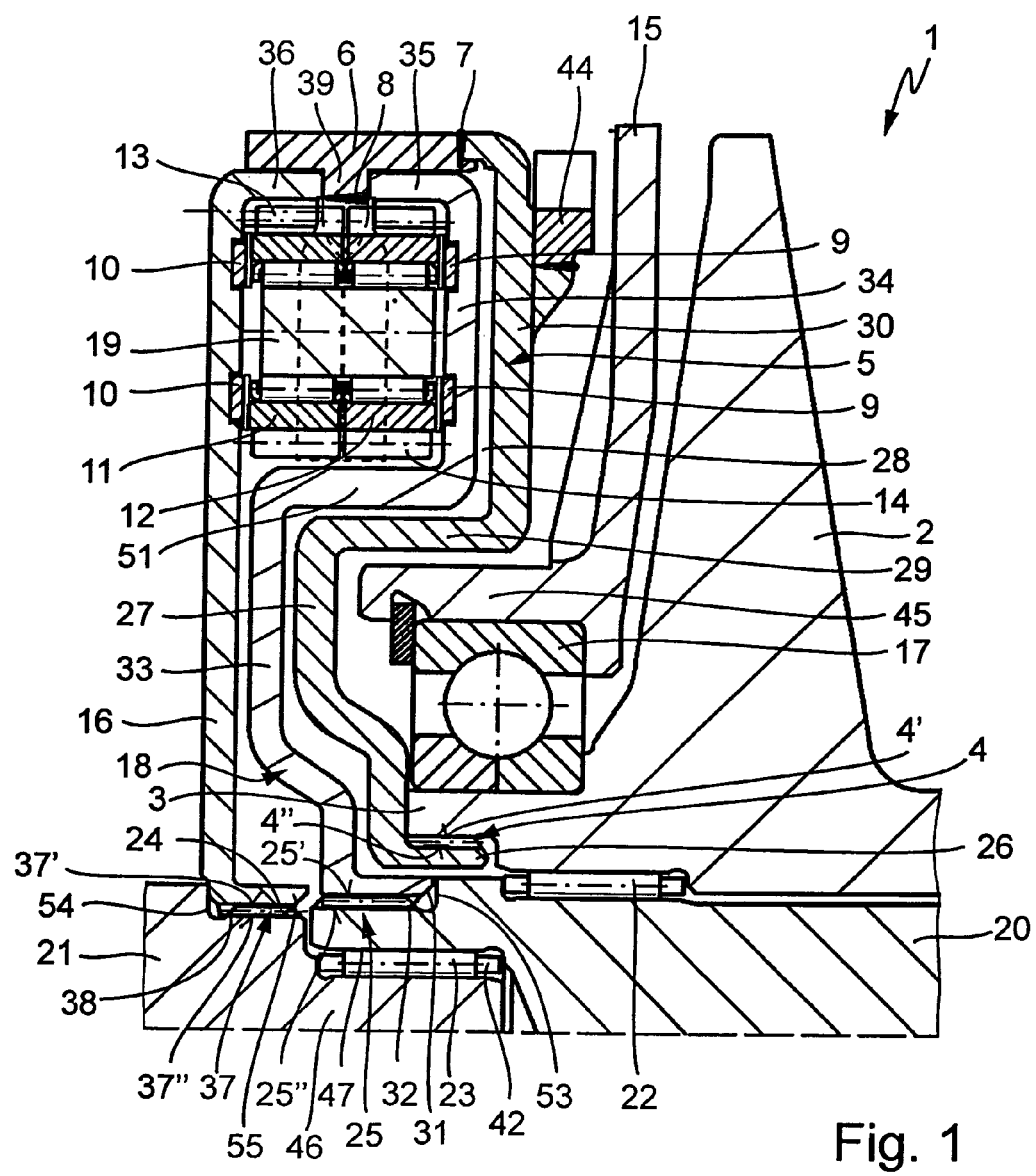
FIG. 1 a section through a first embodiment of the invention-accordant transmission arrangement.

In accordance with FIG. 1, the present transmission arrangement includes essentially a fixed disk 2, of a disk set of a continuously variable transmission 1 (CVT) on a first driven axle 20 relating for example to a front axle of a vehicle, disposed rotatably through a bearing 22, whereby the movable disk of the disk set is not shown. The first driven axle 20 is arranged coaxially to a second driven axle 21 in the manner clarified in detail later, for example, where it relates to the other front axle of the vehicle.

The fixed disk 2 arranged rotatably on the first driven axle 20 through the bearing 22 features a formed, driving axle part 3 that is rotatably supported and fixed with the help of a bearing 17, which preferably relates to a ball bearing in the housing 15 of the present transmission arrangement.

The driving axle part 3 of the fixed disk 2 is in connection non-rotatably, via a tooth system 4, with a disk part 5, which preferably is provided as a sheet metal part. Thereby, a part 4' of the tooth system 4 is arranged on the interior circumference of the driving axle part 3, while the other part 4" of the tooth system 4 is arranged on the outside circumference of an attachment region 26 of disk part 5 extending preferably axially to the side of the fixed disk 2. The disk part 5 extends essentially radially outwards, whereby it extends preferably with a first concavity 27 extending away from the fixed disk 2, starting from the axial attachment region 26, around the bearing 17, and around the bearing region 45 of the housing 15 holding bearing 17. Radially outside the bearing region 45 the disk part 5 includes a second concavity 28 that extends toward the fixed disk 2, preferably in an area 29, axially in the direction toward the fixed disk 2, in order to extend with an area 30 radially outwards. On the radially outside, free end region of the disk part 5, an axially extending carrier part 6 is arranged for the planet gears 11 and 12 of the differential. The carrier part 6 is welded preferably with the disk part 5 as indicated by the weld seam 7.

On the first driven axle 20, a first drive disk 18 is arranged, which is connected non-rotatably with the driven axle 20 via a tooth system 25. Thereby, a part 25' of the tooth system 25 is preferably arranged inside an attachment region 31 of the first drive disk 18, extending axially to the side of the fixed disk 2, while the other part 25 of the tooth system 25 is arranged outside on an axial region 32 of the first driven axle 20.

On the second driven axle 21, a second drive disk 16 is arranged, which is connected non-rotatably with the second driven axle 21 via a tooth system 37. Thereby, a part 37' of the tooth system 37 is arranged inside on an attachment region 55 of the second drive disk 16, preferably to the side of the fixed disk 2 and extending axially, while the other part 37" of the tooth system 37 is arranged outside on an axial region 38 of the second driven axle 21.

The first drive disk 18 is adapted to the form of the disk part 5, i.e., it features a second concavity 33 that extends around the first concavity 27 of the disk part 5 on the side facing away from the fixed disk 2, a region 51 extending axially rearward in the direction toward the disk part 5, and subsequently a third concavity 34 arranged in the region of the concavity 28 of the driven disk 34, which engages into the second concavity 28 of the disk part 5. The free end region 35 of the first drive disk 18 lying radially outside is turned through 90° relative to the radially extending region of third concavity 34 so that it extends radially inside and parallel to the carrier part 6. Through this arrangement of the disk part 5 and the first drive disk 18 the result is that the disk part 5 and the first drive disk 18 lie closely next to one another in the axial direction, and in the radial direction they can be nested in each other. Altogether, they therefore require an extremely small assembly space in the axial direction.

Preferably, both the first drive disk 18 and the second drive disk 16 are in the form of sheet metal parts.

Figure 3:
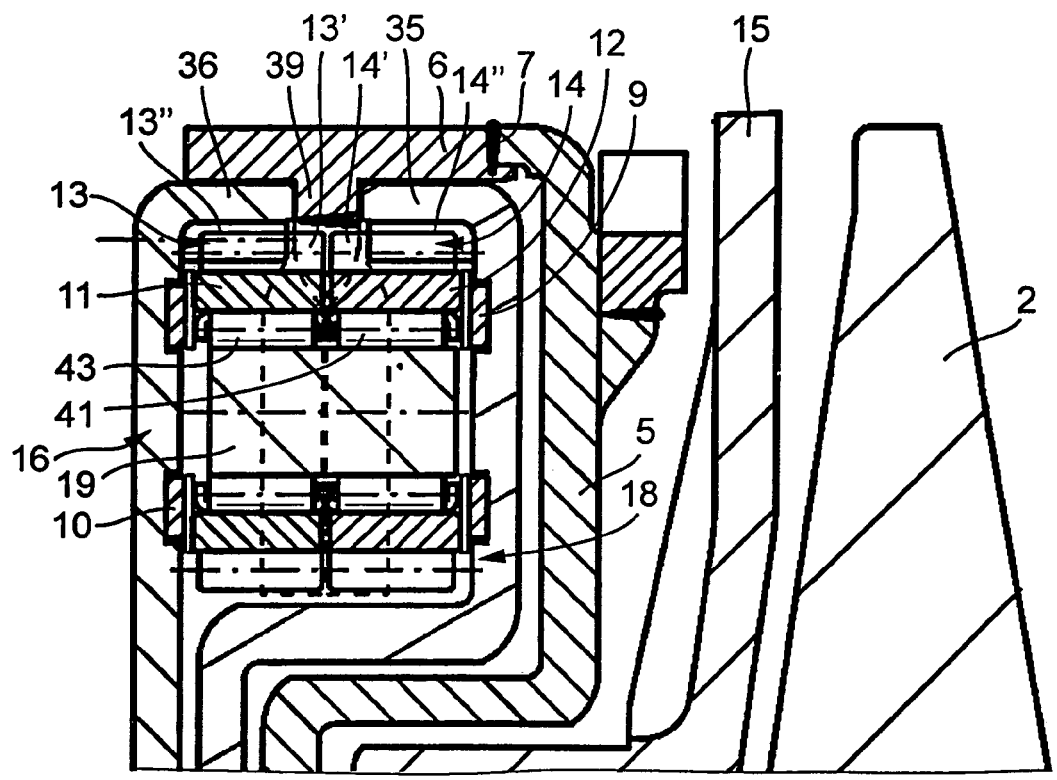
FIG. 3 an enlarged view of a partial region of the transmission arrangement in accordance with the present invention.

On a web part 39, extending radially inwardly at the middle of the axially-extending carrier part 6 between the ends of the end regions 35 and 36 facing one another, an axial shaft 19 is provided for carrying the planet gears 11 and 12. Thus, more precisely, on the shaft 19 as shown in FIG. 3, with the help of a first bearing 41, the first planet gear 12 is supported rotatably on the side facing the fixed disk 2, and is in connection with the free end region 35 of the first drive part 18 via a tooth system 14. A part 14' of the tooth system 14 is formed by the teeth of the planet gear 12 while the other part 14" of the tooth system 14 is arranged inside on the free end region 35 of the first drive disk 18. In a corresponding manner, the second planet gear 11 is supported rotatably on the shaft 19 on the side facing the second drive disk 16, as shown in FIG. 3, with the help of a second bearing 43. Planet gear 11 is in connection with the end region 36 of the second drive part 16 via a tooth system 13. A part 13' of the tooth system 13 is formed by the teeth of the planet gear 11 while the other part 13" of the tooth system 13 is arranged inside on the end region 36 of the second drive disk 16.

The first planet gear 12 is supported on a bearing 9 held on the first drive disk 18 on its side facing the first driven disk 18 which preferably involves a needle bearing. In a corresponding manner, the second planet gear 11 is supported on its side facing the second drive disk 16 on a bearing 10 held on the second drive disk 16, which preferably likewise involves a needle bearing.

The drive disks 16, 18 are fixed in the axial direction on the driven axle parts 20 and 21, in that its attachment areas 37 and/or 31 are supported on shoulder areas 53 and/or 54, which are arranged on the driven axle parts 20, 21.

In the following, the function of the transmission arrangement described above in detail is clarified.

In a straight-line motion, the planet gears 11, 12 do not rotate relatively to one another because the driven axles 20 and 21 rotate at the same speed. The two driven axles 21 and 20 are driven uniformly from the fixed disk 2 over the driving axle part 3, the tooth system 4, the disk part 5, the axially-extending carrier part 6, the tooth systems 13 and 14, as well as the drive disks 16 and 18. Thereby, the stationary planet gears 11, 12 are carried along and they transmit drive torque via the meshing teeth of the tooth systems 13 and 14.

When driving along a curve, the driven axles 20 and 21 rotate at different rotational speeds, whereby the drive disks 16 and 18 likewise rotate at different rotational speeds. The planetary gears 11, 12 therefore rotate on the shaft 19 at different rotational speeds in order to compensate for that difference in rotational speeds of the drive disks.

Figure 2:
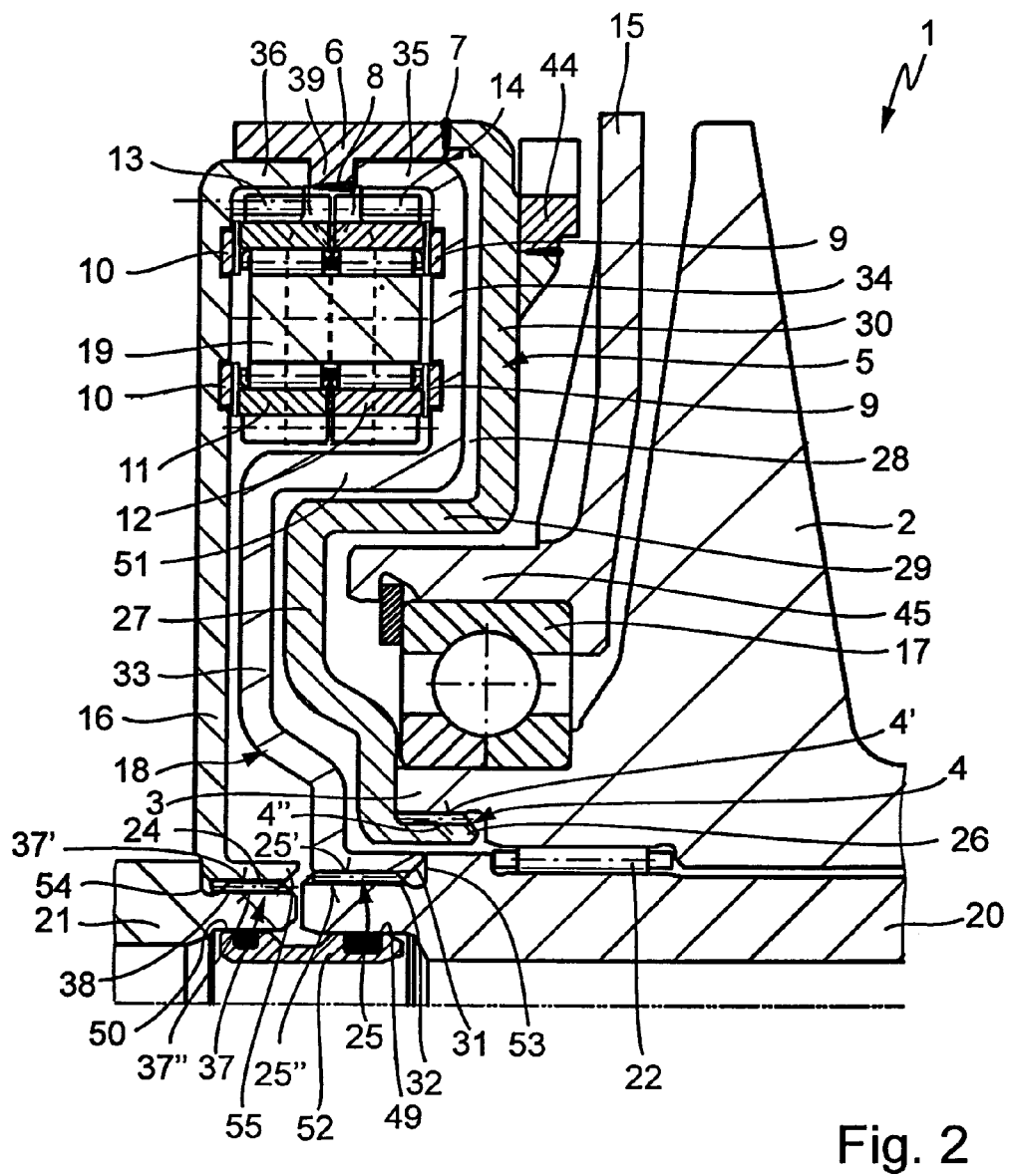
FIG. 2 a section through a second embodiment of the invention-accordant transmission arrangement.

The coaxial connection of the driven axles 20, 21 occurs preferably through a hollow shaft construction, either directly to the driven wheels, or to the individual axle differentials for all-wheel drive vehicles. In accordance with FIG. 1, a second driven axle 21 includes an axial extension 46 that engages in an axial bore 47 of first driven axle 20, whereby a bearing 42 is arranged between the surfaces of the axial extension 46 and the axial bore 47 that face one another. As shown in FIG. 2, both the first driven axle 20 and the second driven axle 21 include an axial bore 49 and 50, respectively, whereby in the end regions of the bores 49, 50 that face one another, a rotational insert 52 for providing oil engages the axles in a bridging and centering manner.

At the side of the disk part 5 facing the fixed disk 2, attachment elements 44 can be provided, which are distributed around the circumference of the disk part 5 and form a sensor wheel, or serve for a parking pawl linkage.

What is claimed is:

1. A transmission arrangement, in particular a differential transmission with a drive-side drive disk, a first drive part that is non-rotatably in connection with a first driven axle, and a second drive part that is non-rotatably in connection with a second driven axle, whereby between the first drive part and the second drive part a gear wheel arrangement for torque transmission is provided from the drive-side disk part to the first drive part and the second drive part, wherein the first drive part features a form of a first drive disk extending from the first driven axle outwards, which, radially from the first driven axle, features a distance from a first concavity, the second drive part features a form of a second drive disk extending from the second driven axle radially outwards, the first concavity of the first drive disk extends away from the second drive disk, the gear wheel arrangement is in a space formed by the first concavity of the first drive disk and the opposite area of the second drive disk.

2. The transmission arrangement according to claim 1, wherein the drive-side disk part is non-rotatably in connection with a driving axle part that is formed on a fixed disk of a continuously variable transmission, whereby the fixed disk is arranged rotatably through a bearing on the first driven axle.

3. The transmission arrangement according to claim 2, wherein the driven disk part features an axial attachment area that engages axially into the driving axle part of the fixed disk and that is in connection with said part via a tooth system.

4. The transmission arrangement according to claim 3, wherein the driving axle part with the help of a bearing is supported on the side opposite to the tooth system of the driving axle part in housing accommodating the transmission arrangement.

5. The transmission arrangement according to claim 4, wherein the driven disk part features a first concavity extending to the first drive part that forms a space for accommodating the bearing as well as the bearing area of the housing surrounding the said, whereby the first concavity of the disk part extends in a second concavity of the first drive disk.

6. The transmission arrangement according to claim 1, wherein the disk part features a second concavity that extends away from the first drive disk (18), and that accommodates the first concavity of the first drive disk.

7. The transmission arrangement according to claim 1, wherein the first drive disk in its side facing the first driven axle features an axial attachment area that is non-rotatably in connection via a tooth system with an axial area of the driven axle and extends preferably to the side of the disk part.

8. The transmission arrangement according to claim 1, wherein the second drive disk features an inner axial attachment area, which is non-rotatably in connection via a tooth system with an axial area of the second driven axle.

9. A transmission arrangement according to claim 1, wherein the driven disk part on the external side is non-rotatably in connection with a carrier part for the gear wheel arrangement such that on the carrier part an inwards protruding web part is formed, which is connected with a shaft part carrying the gear wheel arrangement rotatably, such that the first drive disk on the external side has an end area extending axially in the direction towards the web part, such that the second drive disk on the external side has an end area extending axially in the direction towards the web part, such that the web part extend between the ends of the end areas facing one another, and such that on the shaft part of a first gear wheel is arranged rotatably on the side facing the first drive disk, which, via a tooth system, is in connection with the end area of the first drive disk and that, on the shaft part, a second gear wheel is arranged rotatably on the side facing the second drive part, which is in connection via a tooth system with the end area of the second drive disk.

10. The transmission arrangement according to claim 9, wherein a part of the tooth system is formed by the teeth of the first gear wheel and that the other part of the tooth system is formed on the radial inside of the end area of the first drive disk.

11. The transmission arrangement according to claim 9, wherein a part of the tooth system is formed by the teeth of the first gear wheel and that the other part of the tooth system is formed on the radial inside of the end area of the second drive disk.

12. The transmission arrangement according to claim 1, wherein the driven disk part is formed with a part made of sheet metal.

13. The transmission arrangement according to claim 1, wherein the first drive disk is formed with a part made of sheet metal.

14. The transmission arrangement according to claim 1, wherein the driven disk part is formed with a part made of sheet metal.

15. The transmission arrangement according to claim 1, wherein the driven disk part is connected by a weld seam on the external side with the carrier part with a sheet metal part.

16. The transmission arrangement according to claim 1, wherein the first gear wheel features a form of a revolving rim supported rotatably with the help of a bearing on the shaft part.

17. The transmission arrangement according to claim 1, wherein the second gear wheel features the form of a tooth rim rotatably supported on the shaft part with the help of a bearing.

18. The transmission arrangement according to claim 1, wherein the driven axes are arranged via a hollow shaft construction rotatably and coaxially relative to each other.

19. The transmission arrangement according to claim 18, wherein a driven axle features an axial protrusion area that engages in an axial boring of the other driven axle, whereby a bearing is arranged between the surfaces of the protruding area facing one another and the boring.

20. The transmission arrangement according to claim 18, wherein the first driven axle and the second driven axle respectively feature an axial boring, whereby in the end areas of the borings facing one another a rotary introduction engages in a bridging manner.

21. The transmission arrangement according to claim 1, wherein the driven axes are connected directly to the wheels, preferably to the front wheels of a motor vehicle.

22. The transmission arrangement according to claim 1, wherein the driven axes are connected directly to the wheels, preferably to the differential unit of a four-wheel-drive vehicle.

23. The transmission arrangement according to claim 1, wherein the disk part on its side facing the fixed disk features at least an attachment element that serves as a sensor wheel or for the parking pawl linkage.

* * * * *